United States Patent
Sclafani et al.

(10) Patent No.: US 12,479,131 B2
(45) Date of Patent: Nov. 25, 2025

(54) METHOD FOR THE SELECTION AND SEPARATION OF POLYMERS ORIGINATING FROM URBAN AND/OR INDUSTRIAL PLASTIC WASTE

(71) Applicant: MYREPLAST S.R.L., Milan (IT)

(72) Inventors: Paola Sclafani, Milan (IT); Francesco Micheletti, Arzignano (IT); Marco Rizzo, Brescia (IT); Luigi Molinari, Desenzano del Garda (IT)

(73) Assignee: MYREPLAST S.R.L., Milan (IT)

( * ) Notice: Subject to any disclaimer, the term of this patent is extended or adjusted under 35 U.S.C. 154(b) by 756 days.

(21) Appl. No.: 17/811,271

(22) Filed: Jul. 7, 2022

(65) Prior Publication Data

US 2022/0347891 A1 Nov. 3, 2022

Related U.S. Application Data

(63) Continuation of application No. PCT/EP2021/050054, filed on Jan. 5, 2021.

(30) Foreign Application Priority Data

Jan. 7, 2020 (IT) .................. 102020000000100

(51) Int. Cl.
*B29B 17/02* (2006.01)
*B29B 17/04* (2006.01)

(52) U.S. Cl.
CPC .......... *B29B 17/02* (2013.01); *B29B 17/0412* (2013.01); *B07C 2501/0036* (2013.01); *B07C 2501/0054* (2013.01); *B29B 2017/0203* (2013.01); *B29B 2017/0217* (2013.01); *B29B 2017/0268* (2013.01); *B29B 2017/0279* (2013.01); *B29B 2017/0289* (2013.01); *Y02W 30/62* (2015.05)

(58) Field of Classification Search
CPC ................ B29B 17/02; B29B 17/0412; B29B 2017/0203; B29B 2017/0217; B29B 2017/0268; B29B 2017/0279; B29B 217/0203; B29B 217/0279; B07C 5/3425
See application file for complete search history.

(56) References Cited

U.S. PATENT DOCUMENTS

2014/0231557 A1 8/2014 Riise et al.
2017/0336264 A1* 11/2017 Chanda .............. G01N 21/3563

FOREIGN PATENT DOCUMENTS

| EP | 2823945 A2 | 7/2014 |
| EP | 2823945 A3 | 7/2014 |
| WO | 2004101178 A1 | 11/2004 |

OTHER PUBLICATIONS

Van Engelshoven, Y. et al. An Innovative Route to Circular Rigid Plastics. Sustainability 2019, 11, 6284; doi:10.3390/su11226284. (Year: 2019).*
Machine translation of EP 2823945 by Peters et al. (Year: 2015).*
Kaihara, M. et al. Systematization Method for Distinguishing Plastic Groups by Using NIR Spectroscopy. Analytical Sciences Jul. 2007, vol. 23 pp. 921-924 (Year: 2007).*
Becker, Wolfgang et al.: "Detection of Black Plastics in the Middle Infrared Spectrum (MIR) Using Photon Up-Conversion Technique for Polymer Reycling Purposes," vol. 9, No. 435, Sep. 8, 2017, XP055537028, 9 pages.
Kaihara, Mikio et al.: Systemization Method for Distinguishing Plastic Groups by Using NIR Spectroscopy, Analytical Sciences, Jul. 10, 2007, vol. 23, The Japan Society for Analytical Chemistry, XP055724825, 4 pages.
International Search Authority: European Patent Office International Search Report for International Patent Application No. PCT/EP2021/050054, dated Jan. 5, 2021, 4 pages.

* cited by examiner

*Primary Examiner* — Christina H. W. Rosebach
(74) *Attorney, Agent, or Firm* — Patterson Intellectual Property Law, PC

(57) ABSTRACT

The present invention concerns a method for the selection and separation of polymers originating from urban and/or industrial plastic waste to obtain plastic materials for recycling which comprises a first step of supplying a mixture of polymers composed of flakes of polymers having dimensions ranging from 6 to 100 mm; a step of identification by means of near-infrared (NIR) spectroscopy of the flakes of coloured and white plastic material and the flakes of black plastic material and subsequent separation from one other; several consecutive steps of identification by means of NIR spectroscopy of the different types of polymer from the coloured and white plastic material and subsequent separation of said polymer types.

12 Claims, No Drawings

METHOD FOR THE SELECTION AND SEPARATION OF POLYMERS ORIGINATING FROM URBAN AND/OR INDUSTRIAL PLASTIC WASTE

CROSS-REFERENCES TO RELATED APPLICATIONS

This application claims benefit of the following patent applications which are hereby incorporated by reference in their entirety: International Patent Application No. PCT/EP2021/050054 filed Jan. 5, 2021, which claims priority to Italian Patent Application No. 102020000000100 filed Jan. 7, 2020.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention refers to a method for the selection and separation of polymers originating from urban and/or industrial plastic waste to obtain plastic materials for recycling.

BACKGROUND

The disposal of plastic constitutes an important environmental problem, considering the large quantity of plastic waste produced at both domestic and industrial level, especially in the most industrialized countries. Although currently the majority of plastic goes mainly to landfill or is directly abandoned in the environment at the end of its life, today some technologies and processes exist to attempt to solve the problem of plastics disposal. Various approaches and technologies are used to deal with the problem, including combustion, re-melting of plastic for the production of new objects, and biodegradation, if the plastic is biodegradable. It is known, however, that only a relatively small part of the plastic currently produced is biodegradable.

Each of the above-mentioned approaches entails a loss of value of the product obtained after transformation relative to the value of the original plastic. This is evident in the case of combustion, considering that in this technology the plastic is used simply as a fuel, and also in the case of biodegradation, considering that the product obtained from the biodegradation is used in applications having low economic value, for example as a soil improver in agriculture or, after further transformations, as a solid fuel.

Also in the case of re-melting of plastic for the production of objects there is a loss of value, since the object obtained from recycled plastic is used in an application having a lower value than that of the original product.

None of the above-mentioned technologies are able to restore the original value of the plastic, since it is obviously not possible to transform recycled plastic into virgin plastic.

A significant loss of virgin plastic therefore occurs every year, entailing the need to produce new plastic to replace the plastic abandoned in the environment, which constitutes the vast majority, and the plastic transformed into other products, intended for applications different from those of the original plastic. Furthermore, the production of new plastic negatively impacts the availability of fossil resources, which are the raw material used for the production of plastic.

In recent years techniques for the differentiation of plastic materials originating from waste have been developed and have evolved in order to obtain re-usable materials and therefore reduce the production of virgin material.

However, the normal separation techniques do not achieve a high purity percentage of the selected polymer which is therefore heavily contaminated by other types of polymer and can be used only for the production of low quality articles.

In this context, the technical task of the present invention is to provide a method for the mechanical separation of polymers from a mixture of polymers originating from commercial and/or industrial plastic waste able to differentiate the different materials and separate them, obtaining recycled material with high purity.

A selection and separation method able to separate the selected polymer with high accuracy, so as to obtain fractions of separated material with high purity, differentiated in terms of both type and color of the material, would therefore be desirable.

A selection and separation method able to operate continuously, without interruption, so as to process a high quantity of material would also be desirable.

BRIEF SUMMARY

In particular, one object of the present disclosure is to provide a separation method that is able to obtain a separated fraction of polymer material with a purity higher than 95% so that it can be used for the production of high level articles, substituting a portion of or the entire virgin material.

Another object of the present disclosure is to provide a separation method able to select and separate the different types of plastic material also according to color, so as to obtain a single-material and single-color product that can be directly re-used in the plastics industry.

A further object of the present disclosure is to provide a method for the separation of polymers able to select and separate polymers of different type even when the plastic material is black, so as to obtain fractions of high purity material also in this type of material.

A further object of the present disclosure is to provide a method for the separation of polymers able to operate continuously so as to select and separate a high quantity of material.

The above-mentioned and other objects and advantages of the invention, which will become clear from the following description, are achieved by a method as disclosed herein.

In particular said objects are achieved by means of a method for the mechanical selection and separation of at least two polymers from a mixture of polymers originating from commercial and/or industrial plastic waste, comprising the steps of:

i. providing a mixture of polymers originating from commercial and/or industrial plastic waste consisting of polymer flakes having dimensions ranging from 6 to 100 mm;

ii. identifying by means of near-infrared (NIR) spectroscopy the flakes of coloured and white plastic material and separating a fraction (F1) rich in said flakes of coloured and white plastic material from a fraction (F2) rich in flakes of black plastic material by appropriate separation means;

iii. identifying by means of the NIR spectroscopy the flakes of a polymer P1 from said fraction (F1) rich in flakes of coloured and white plastic material separated in step ii, and separating a fraction (F3) rich in flakes of polymer P1 from said fraction (F1) rich in flakes of coloured and white plastic material by means of appropriate separation means, obtaining a fraction (F4) poor in flakes of polymer P1;

iv. identifying by means of the NIR spectroscopy the flakes of polymer different from P1 from the fraction (F3) rich in flakes of polymer P1 separated in step iii and separating a fraction (F5) rich in flakes of polymers different from P1 from said fraction (F3) rich in flakes of polymer P1 by means of appropriate separation means;

v. identifying by means of the NIR spectroscopy the flakes of a polymer P2 from said fraction (F4) poor in flakes of polymer P1 separated in step iii and from said fraction (F5) rich in flakes of polymers different from P1 separated in step iv, and separating a fraction (F6) rich in flakes of polymer P2 from said fraction (F1) rich in flakes of coloured and white plastic material by means of appropriate separation means, obtaining a fraction (F7) poor in flakes of polymer P2;

vi. identifying by means of the NIR spectroscopy the flakes of polymers different from P2 from the fraction (F6) rich in flakes of polymer P2 separated in step v and separating a fraction (F8) rich in flakes of polymers different from P2 from said fraction (F6) rich in flakes of polymer P2 by means of appropriate separation means.

Preferably the method described above further comprises the steps of:

vii. identifying by means of mid-infrared (MIR) spectroscopy the flakes of a polymer P3 from said fraction (F2) rich in flakes of black plastic material separated in step ii, and separating a fraction (F9) rich in flakes of polymer P3 from said fraction (F2) rich in flakes of black plastic material by means of appropriate separation means, obtaining a fraction (F10) poor in flakes of polymer P3;

viii. identifying by means of the MIR spectroscopy the flakes of polymers different from P3 from the fraction (F9) rich in flakes of polymer P3 separated in step vii and separating a fraction (F11) rich in flakes of polymers different from P3 from said fraction (F9) rich in flakes of polymers P3 by means of appropriate separation means;

ix. identifying by means of the MIR spectroscopy the flakes of a polymer P4 from said fraction (F10) poor in flakes of polymer P3 separated in step vii and from said fraction (F11) rich in flakes of polymers different from P3 separated in step viii, and separating a fraction (F12) of flakes of polymer P4 from said fraction (F2) rich in flakes of black plastic material by means of appropriate separation means, obtaining a fraction (F13) poor in flakes of polymer P4;

x. identifying by means of the MIR spectroscopy the flakes of polymers different from P4 from the fraction (F12) rich in flakes of polymer P4 separated in step ix and separating a fraction (F14) rich in flakes of polymers different from P4 from said fraction (F12) rich in flakes of polymer P4 by means of appropriate separation means.

In this way a method is provided able to separate also black polymers, which are normally difficult to identify and separate given their colour which prevents correct reading with the NIR spectroscopy.

Preferably the method according to the present invention comprises a step of separation and elimination of any metallic material, both ferrous and non-ferrous, from the flakes of plastic material prior to carrying out the identification and separation of step ii.

In this way the plastic material is cleaned of other foreign materials that can reduce the final purity of the polymer, causing damage to the machinery such as, for example, extruders used for recycling the plastic after the selection and separation described above.

Preferably the method according to the present invention comprises a step of grinding of commercial and/or industrial plastic waste to obtain said material in flakes having dimensions ranging from 6 to 100 mm.

In this way the plastic material is prepared so as to allow a correct and effective selection and separation of the various components in order to obtain a separated polymer material with a purity higher than 95% so that it can be used directly in recycling of the plastic material.

Preferably the method according to the present invention comprises the steps of:

xi. identifying by means of the NIR spectroscopy the flakes of a polymer P5 from said fraction (F7) poor in flakes of polymer P2 separated in step v, and from said fraction (F8) rich in flakes of polymer different from P2 separated in step vi, and separating a fraction (F15) rich in flakes of polymer P5 from said fractions (F7) and (F8), obtaining a fraction (F16) poor in flakes of polymer P5;

xii. identifying by means of the NIR spectroscopy the flakes of polymers different from P5 from the fraction (F15) rich in flakes of polymer P5 separated in step xi and separating a fraction (F17) rich in polymers different from P5 from said fraction rich in flakes of polymer P5 by means of appropriate separation means.

In this way a method is provided able to separate more than two polymers from the mixture of polymers originating from commercial and/or industrial plastic waste.

Preferably the method according to the present invention comprises a further step of identifying by means of UV/VIS spectroscopy the colour of the flakes of the polymers separated in the steps previously described, and separating a fraction rich in flakes of uniform colour of said polymers by means of appropriate separation means.

In this way fractions of single-material polymer with uniform colour are obtained that can be directly used in recycling processes of the plastic material also for the production of high-quality objects.

Preferably the method according to the present invention comprises a further step of identifying, by means of the NIR spectroscopy, flakes of one of said polymers P1 or P2 or P5 based on the melt flow index of the polymer and separating a phase rich in said polymer by means of appropriate separation means.

In this way a process is provided able to separate the HDPE (high-density polyethylene) from the LDPE (low-density polyethylene).

Preferably the method according to the present invention comprises a further step of washing the flakes of polymer P1 and P2, if necessary polymer P3 and P4 and if necessary polymer P5, after the steps of identifying and separating a phase rich in said polymer described previously.

In this way an end product is obtained without impurities and dirt such that it can be used directly in the subsequent material recycling steps without altering the quality of the polymer and consequently without altering the quality of the products produced with these polymers.

Preferably the method according to the present invention provides that in said identification and separation steps the material to be identified and separated has a surface distribution ranging from 1 to 20 kg/cm² per reading unit.

This guarantees correct positioning of the flakes when they undergo identification by means of NIR spectroscopy or MIR spectroscopy in order to obtain a separated polymer material with a purity higher than 95%.

Preferably the method according to the present invention provides for separation of the polymers by means of jets of compressed air.

In this way it is possible to have a high work flow and optimal separation of the selected polymer.

According to the present invention the polymers P3 and P4 can be of chemical type equal to or different from the polymers P1 and P2 selected and separated in the steps previously described. In other words the polymers P3 and P4 can be the same polymers P1 and P2 but selected and separated from a mixture of black polymer flakes.

DETAILED DESCRIPTION

The method according to the present invention will be described below in a preferred non-limiting embodiment thereof.

The method according to the present invention can be implemented by the use of machinery already used in industry such as, for example, conveyor belts, loading hoppers, etc., as will be described below.

The method according to the present invention can be applied for the selection and separation of various polymers such as, for example, polypropylene (PP), polystyrene (PS), polyethylene (PE), high and low density polyethylene (HDPE, LDPE), polyethylene terephthalate (PET), polyvinyl chloride (PVC), acrylonitrile-butadiene-styrene (ABS) or others.

The method according to the present invention is implemented in a process for the mechanical selection and separation of polymers as will be described below. In particular a process for the separation of three different polymers from a polymer mixture will be described.

The process described below refers to the selection of polyethylene (PE), polystyrene (PS) and polypropylene (PP) from a mixture of polymers originating from plastic waste.

Said polymers are selected arbitrarily in order to permit a better understanding of the separation method according to the present invention, and therefore cannot be considered as limitative or reductive of said method.

A mixture of polymers originating from commercial and/or industrial plastic waste, preferably already cleaned of any non-polymeric organic or inorganic material, is fed into a grinder able to grind the material in order to obtain flakes of plastic material having approximate dimensions ranging from 6 to 100 mm or with a surface ranging from approximately 6 to 100 mm². Preferably the dimension of the flakes of ground material is between 15 and 80 mm so as to obtain a flake that is easy to select and separate by means of appropriate selection and separation means as will be described below.

By means of appropriate conveyor belts, the flakes of plastic material are conveyed to an apparatus where any ferrous metallic material present in the polymer mixture is eliminated by the use of neodymium magnets. The flakes are then conveyed to a second apparatus where any non-ferrous metallic material present in the polymer mixture is eliminated by the use of eddy currents.

The polymer mixture substantially without metals is then deposited on a conveyor belt so as to obtain a surface distribution of the material on the belt ranging from 1 to 20 kg/cm², preferably ranging from 3 to 10 kg/cm². In this way the flakes will be optimally distributed avoiding any overlapping of flakes which would invalidate the subsequent selection by means of optical instruments. Said distribution of the material can be defined as surface distribution per reading unit.

The material thus distributed is sent to a selection apparatus whereby means of the near-infrared (NIR) spectroscopy the flakes of coloured or white plastic material are identified from the flakes of black plastic material.

According to the present invention, the term coloured indicates a material that absorbs all the electromagnetic radiations incident in the visible field with the exception of the radiations with wavelength relative to the colour referred to.

According to the present invention, the term white (or achromatic colour) indicates a material able to reflect all the electromagnetic radiations incident in the visible field.

According to the present invention the term black indicates an object that absorbs all the electromagnetic radiations incident in the visible field without reflecting it. Black corresponds to the visual impression experienced when no visible light reaches the eye.

As is known in the art, NIR (near-infrared) spectroscopy is a spectroscopic absorption technique that uses the electromagnetic radiation in the near infrared spectrum, namely with a wavelength ranging from 780 nm to 2500 nm.

With NIR spectroscopy, materials of different nature can be selected based on the selective absorption of the infrared radiations by the different plastic materials.

The first apparatus is therefore able to select the coloured or white plastic material thanks to the NIR spectroscopy since the black pigments present in the plastic material absorb the infrared rays, making the material "invisible" to the optical selector.

The plastic material thus selected is separated by means of jets of compressed air that hit the selected material, namely the material identified by the NIR spectroscopy, projecting it onto a different conveyor belt. The jets of compressed air may hit the non-selected material, namely the material not identified by the NIR spectroscopy, depending on how the apparatus is set.

The remaining plastic material is then transferred by gravity to a different conveyor belt.

This separation procedure will be used for all the selection and separation steps described below.

According to the present invention, other separation methods and procedures can also be used, not explicitly described in the present description.

After the separation obtained due to the jets of compressed air, there will be two fractions of different plastic material, one fraction F1 rich in flakes of coloured and white plastic material, and one fraction F2 rich in flakes of black plastic material.

The fraction F1 rich in flakes of coloured and white plastic material is then sent to a selection apparatus whereby means of the NIR spectroscopy, the PE flakes are recognized and separated by means of jets of compressed air, forming a fraction F23 rich in PE flakes. Analogously a fraction F4 is formed poor in PE flakes.

The fraction F3 rich in PE flakes is sent again to a selection apparatus whereby means of the NIR spectroscopy the flakes of polymers different from PE are identified. These flakes are separated by means of jets of compressed air, forming a fraction F5 rich in flakes of polymers different from the PE. The remaining PE flakes will have a purity, in terms of PE, of 95% or higher.

The fraction 14 poor in PP flakes and the fraction F5 rich in flakes of polymers different from PE are placed together on one single conveyor belt and sent to a selection apparatus where by means of the NIR spectroscopy, the PP flakes are identified and separated by means of jets of compressed air, forming a fraction F6 rich in PP flakes. Analogously, a fraction F7 is formed, poor in PP flakes.

The fraction F6 rich in PP flakes is sent again to a selection apparatus where by means of the NIR spectroscopy the flakes of polymers different from the PP are identified. These flakes are separated by means of jets of compressed air, forming a fraction F8 rich in flakes of polymers different from the PP. The remaining PP flakes will have a purity, in terms of PP, of 95% or higher.

In order to select and separate different types of polymers also from the fraction rich in flakes of black plastic material, selected and separated in one of the steps previously described, the fraction F2 is sent to a selection apparatus where by means of the MIR spectroscopy the PE flakes are identified from the fraction F2 of flakes of black plastic material.

As is known from the art, MIR (medium infrared radiation) spectroscopy is a spectroscopic absorption technique that uses the electromagnetic radiation in the intermediate infrared spectrum, namely with a wavelength ranging from 2.5 μm to 25 μm.

After the selection and separation of PE from the fraction F2, a fraction F9 is obtained rich in flakes of black PE and a corresponding fraction F10 poor in flakes of black PE.

The fraction F9 rich in flakes of black PE is sent again to a selection apparatus where by means of the MIR spectroscopy the flakes of polymers different from PE are identified. These flakes are separated by means of jets of compressed air, forming a fraction F11 rich in flakes of polymers different from the PE. The remaining black PE flakes will have a purity, in terms of PE, of 95% or higher.

The fraction F10 poor in black PE flakes and the fraction F11 rich in black flakes of polymers different from the PE are placed together on one single conveyor belt and sent to a selection apparatus where by means of the MIR spectroscopy the black PP flakes are identified and separated by means of jets of compressed air forming a fraction F12 rich in black PP flakes. Analogously, a fraction F13 is formed poor in black PP flakes.

The fraction F12 rich in black PP flakes is sent again to a selection apparatus where by means of the MIR the flakes of polymers different from the black PP are identified. These flakes are separated by means of jets of compressed air forming a fraction F14 rich in flakes of polymers different from the PP. The remaining PP black polymer flakes will have a purity, in terms of PP, of 95% or higher.

In order to separate a further type of polymer from the mixture of polymers originating from plastic waste, the fractions F7 and F8 previously described are placed together on one single conveyor belt and sent to a selection apparatus where by means of the NIR spectroscopy the PS flakes are identified. These flakes are separated by means of jets of compressed air, forming a fraction F15 rich in PS flakes. Analogously, a fraction F16 is formed poor in PS flakes.

The fraction F15 rich in PS flakes is sent again to a selection apparatus where by means of the NIR spectroscopy the flakes of polymers different from the PS are recognized. These flakes are separated by means of jets of compressed air, forming a fraction F17 rich in flakes of polymers different from the PS. The remaining PS flakes will have a purity, in terms of PS, of 95% or higher.

The polyethylene flakes previously selected and separated, both the coloured and white, and the black ones, can be further selected and separated by means of a further separation step based on NIR pr MIR spectroscopy. In fact, it is widely known that the different average length of the PE polymer chains (average molecular weight) affects the NIR or MIR spectrum of the polymer. Therefore, via a further NIR-based or MIR-based selection step, it is possible to select and separate higher molecular weight PE flakes (qualitatively characterized by a lower Melt Flow Index) from lower molecular weight PE flakes (qualitatively characterized by a higher Melt Flow Index).

In particular, the PE flakes are selected by means of NIR or MIR spectroscopy and separated by jets of compressed air as previously described.

The flakes previously selected and separated according to their type of component polymer are furthermore sent to appropriate grinding equipment in order to further reduce their dimension, thus obtaining flakes of material having dimension such as to be immediately used in plastic extrusion equipment.

These flakes are also sent to appropriate washing equipment, where they are washed with water, and if necessary with specific products, in order to eliminate any residues of dirt or eliminate the dust of polymer material that may have formed in the selection and separation steps described above.

The coloured and white flakes of PE (both HDPE and LDPE), PP and PS previously separated, ground and washed are conveyed to a successive selection and separation apparatus whereby means of UV/VIS spectroscopy they are selected according to specific colour and separated by jets of compressed air.

As is known in the art, UV/VIS (Ultraviolet/Visible) spectroscopy is a spectroscopic absorption technique that uses electromagnetic radiation in the ultraviolet/visible spectrum, namely with a wavelength ranging from 400 nm to 700 nm.

With a method as described in the present invention it is possible to select and separate an indefinite number of different polymers. The method can therefore be applied to mixtures comprising more than three polymers as described above without reducing the selection and separation efficiency.

The invention claimed is:

1. A method for the mechanical selection and separation of at least two polymers from a mixture of polymers originating from commercial and/or industrial plastic waste, the method comprising:
   i. providing a mixture of polymers from commercial and/or industrial plastic waste comprising flakes of said polymers of sizes from 6 to 100 mm;
   ii. identifying from the provided mixture via near-infrared (NIR) spectroscopy flakes of colored and white plastic material and separating a fraction rich in said flakes of colored and white plastic material from a fraction rich in flakes of black plastic material;
   iii. identifying via the NIR spectroscopy flakes of a first polymer from said separated fraction rich in flakes of colored and white plastic material, and separating a fraction rich in flakes of the first polymer from said fraction rich in flakes of colored and white plastic material, further obtaining a fraction poor in flakes of the first polymer;
   iv. identifying via the NIR spectroscopy flakes of one or more further polymers different from the first polymer from the separated fraction rich in flakes of the first polymer, and separating a fraction rich in flakes of the one or more further polymers from said fraction rich in flakes of the first polymer;

v. identifying via the NIR spectroscopy the flakes of a second polymer from said fraction poor in flakes of the first polymer and from said fraction rich in flakes of the one or more further polymers, and separating a fraction rich in flakes of the second polymer from said fraction rich in flakes of colored and white plastic material, further obtaining a fraction poor in flakes of the second polymer;

vi. identifying via the NIR spectroscopy flakes of one or more polymers different from the second polymer from the fraction rich in flakes of the second polymer, and separating a fraction rich in flakes of the one or more polymers different from the second polymer from said fraction rich in flakes of the second polymer.

2. The method of claim 1, further comprising:

vii. identifying via mid-infrared (MIR) spectroscopy flakes of a third polymer from said separated fraction rich in flakes of black plastic material, and separating a fraction rich in flakes of the third polymer from said fraction rich in flakes of black plastic material, further obtaining a fraction poor in flakes of the third polymer;

viii. identifying via the MIR spectroscopy flakes of polymers different from the third polymer from the separated fraction rich in flakes of the third polymer, and separating a fraction rich in flakes of one or more polymers different from the third polymer from said fraction rich in flakes of the third polymer;

ix. identifying via the MIR spectroscopy flakes of a fourth polymer from said separated fraction poor in flakes of the third polymer and from said separated fraction rich in flakes of polymers different from the third polymer, and separating a fraction of flakes of the fourth polymer from said fraction rich in flakes of black plastic material, further obtaining a fraction poor in flakes of the fourth polymer;

x. identifying via the MIR spectroscopy flakes of polymers different from the fourth polymer from the separated fraction rich in flakes of the fourth polymer, and separating a fraction rich in flakes of polymers different from the fourth polymer from said fraction rich in flakes of the fourth polymer.

3. The method of claim 1, comprising a step of separation and elimination of any metallic material, both ferrous and non-ferrous from said flakes of plastic material prior to carrying out the identification and separation of step ii.

4. The method of claim 1, comprising a step of grinding commercial and/or industrial plastic waste to obtain said flakes of material having dimensions ranging from 6 to 100 mm.

5. The method of claim 1, comprising:

xi identifying via the NIR spectroscopy flakes of a fifth polymer from said separated fraction poor in flakes of the second polymer, and from said separated fraction rich in flakes of polymer different from the second polymer, and separating a fraction rich in flakes of the fifth polymer from said fraction poor in flakes of the second polymer and said fraction rich in flakes of the polymers different from the second polymer, further obtaining a fraction poor in flakes of the fifth polymer;

xii. identifying via the NIR spectroscopy flakes of polymers different from the fifth polymer from the separated fraction rich in flakes of the fifth polymer, and separating a fraction rich in polymers different from the fifth polymer from said fraction rich in flakes of the fifth polymer.

6. The method of claim 5, further comprising identification via UV/VIS spectroscopy of a color of flakes of the polymers separated in each of steps ii, iii, iv, v, vi, xi, and xii, and further separation of a fraction rich in flakes of uniform color of said polymers.

7. The method of claim 1, further comprising identification via UV/VIS spectroscopy of a color of flakes of the polymers separated in each of steps ii, iii, iv, v, and vi, and further separation of a fraction rich in flakes of uniform color of said polymers.

8. The method of claim 1, comprising a further identification step, via NIR spectroscopy, of flakes of one of said first and second polymers according to an average molecular weight of the polymer and separation of a phase rich in said polymer.

9. The method of claim 1, comprising a further washing step of said flakes of the first polymer and said flakes of the second polymer, after the respective identification and separation of a phase rich in said polymers.

10. The method of claim 5, comprising a further wherein the washing step of said flakes of the first, second, further comprises washing flakes of the third, fourth, and fifth polymers, after the respective identification and separation of a phase rich in said polymers.

11. The method of claim 1, wherein said separation of the polymers is carried out via compressed air jets.

12. The method of claim 5, comprising a further identification step, via NIR spectroscopy, of flakes of one of said first, second, and fifth polymers according to an average molecular weight of the polymer and separation of a phase rich in said polymer.

* * * * *